Figure 1:
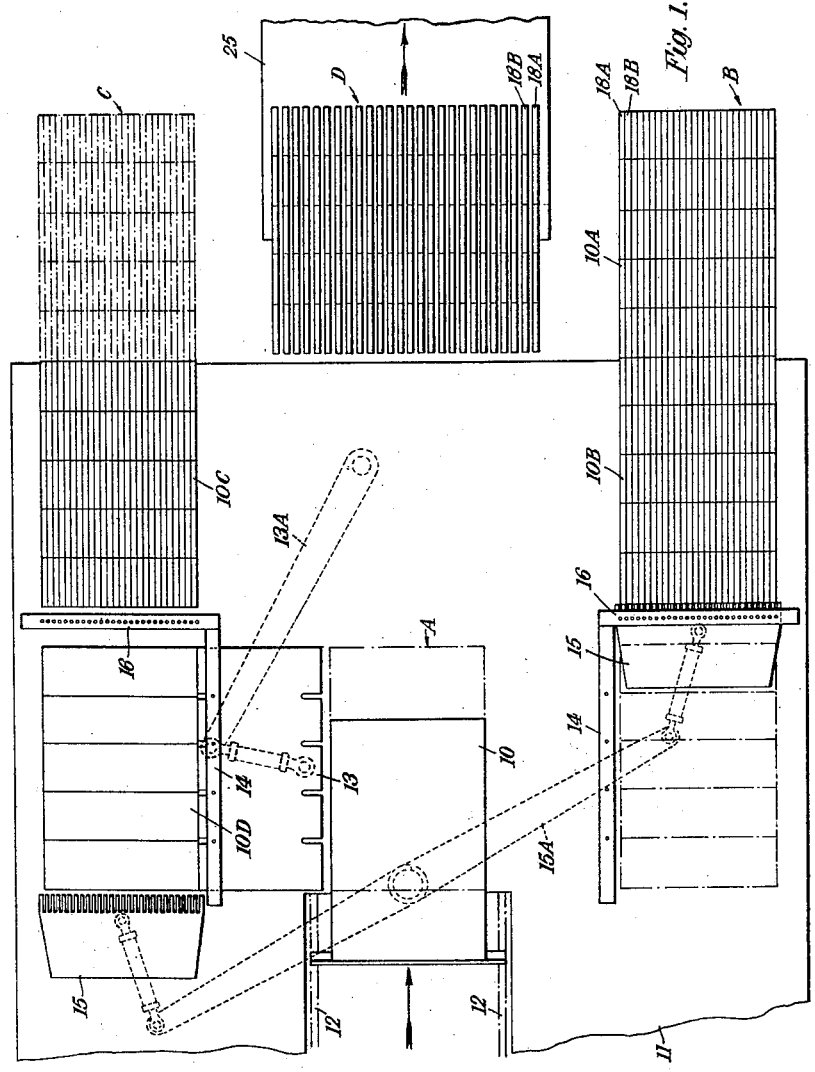

INVENTOR:
J. G. Sanchez
By Watson, Cole, Grindle & Watson
ATTORNEYS

Oct. 29, 1963  J. G. SANCHEZ  3,108,681
SPACER AND TRANSFER APPARATUS
Filed Sept. 24, 1962  7 Sheets-Sheet 2

INVENTOR
J. G. Sanchez
By Watson, Cole, Grindle & Watson
ATTORNEYS

INVENTOR
J.G. SANCHEZ

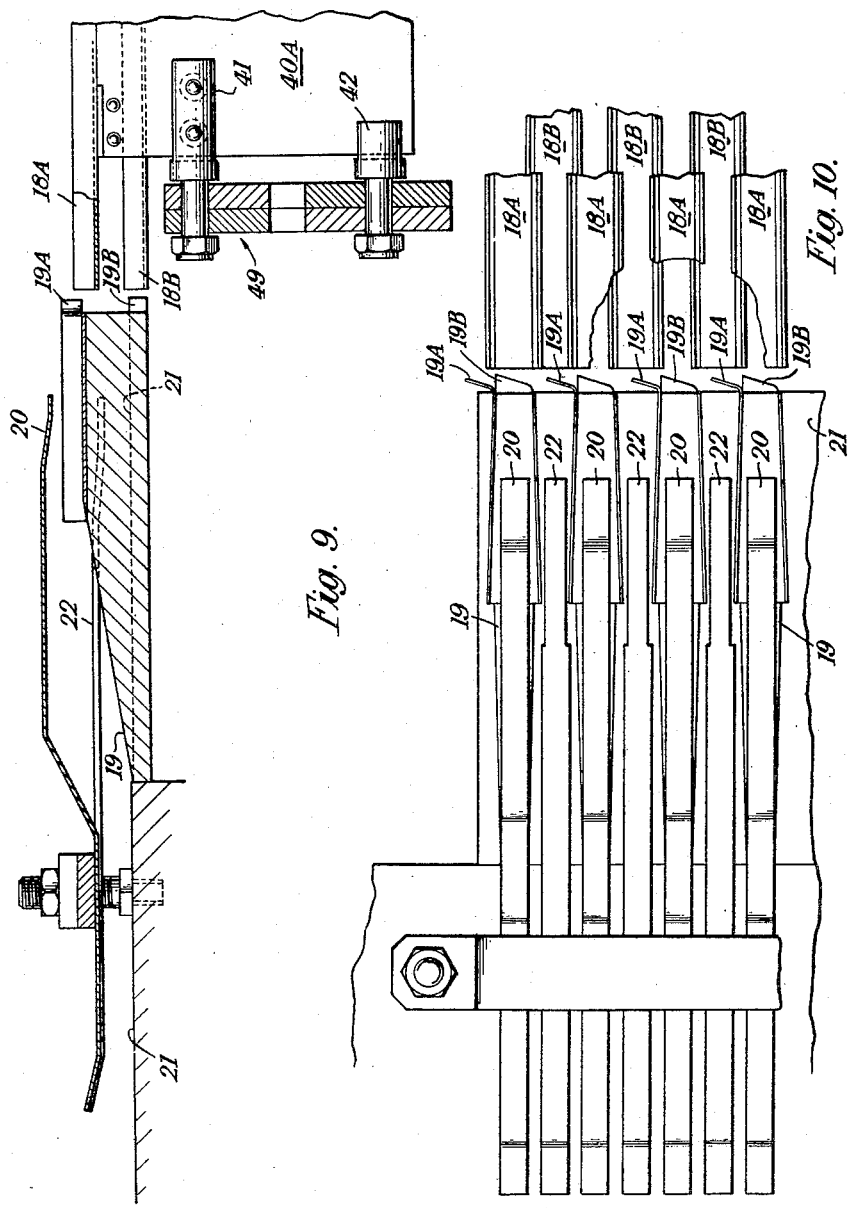

United States Patent Office 3,108,681
Patented Oct. 29, 1963

3,108,681
SPACER AND TRANSFER APPARATUS
John George Sanchez, Cleadon, England, assignor to Baker Perkins Limited, Peterborough, England, a company of Great Britain
Filed Sept. 24, 1962, Ser. No. 225,689
5 Claims. (Cl. 198—34)

This invention relates to the manufacture of wafer sandwiches. Such sandwiches are manufactured in the form of wafer sandwich blocks which are subsequently cut both longitudinally and transversely into indviidual sandwiches. The rows of sandwiches extending longitudinally in the cut blocks are herein referred to as files of sandwiches. It is necessary after cutting to space the closely adjacent files of sandwiches in the cut blocks laterally preparatory to their passage to further processing equipment, e.g. an enrober for coating them with chocolate or the like, moulding equipment for moulding chocolate or the like around them or a packing machine.

I have described in United States Patent No. 2,956,524, patented October 18, 1960, apparatus for effecting lateral separation of the files of wafer sandwiches which includes a series of trays situated alternately at a higher and at a lower level and each serving to accommodate a file of wafer sandwiches, ascending and descending ramps leading to and from each of the higher trays, means for affecting lateral separation of the trays after each cut sandwich block has been pushed on the trays by its successor and thereafter returning them to their initial receiving position and an overhead flight conveyor for removing the files of sandwiches from the trays while they are separated.

While this separating apparatus operates satisfactorily with comparatively wide wafer sandwiches, it is not so satisfactory for narrow sandwiches having a width of the order of ¼" because the fingers on the overhead flight conveyor which remove the sandwiches from the trays do not always provide sufficient control over the sandwiches travelling down the descending ramps. The present invention provides a modified form of wafer separating apparatus which is suitable both for wide and for narrow sandwiches and in which the overhead conveyor has full control over all the sandwiches as they are removed from the trays.

The separating apparatus according to the invention includes a series of parallel trays movable from a receiving position, in which they are situated close together with alternate trays situated at upper and lower levels, to a spaced position in which the trays are spaced apart and are all at the same level, ascending ramps at the receiving position for conducting wafer sandwiches to the high level trays, mechanism for moving the trays from the receiving position to the spaced position after the files of sandwiches in a cut sandwich block have been pushed on to the trays and thereafter returning the trays to their receiving position and an overhead flight conveyor for removing the sandwiches endwise from the trays while they are in their spaced position.

Figure 2:
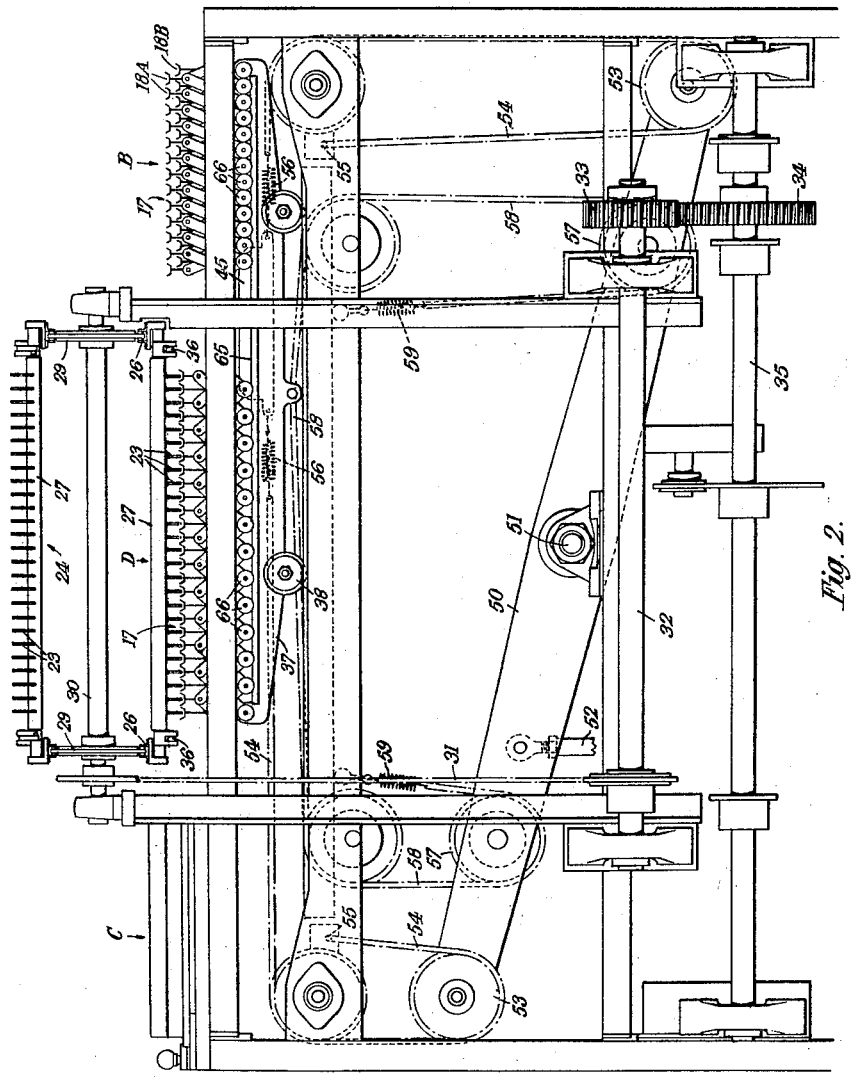
Figure 3:
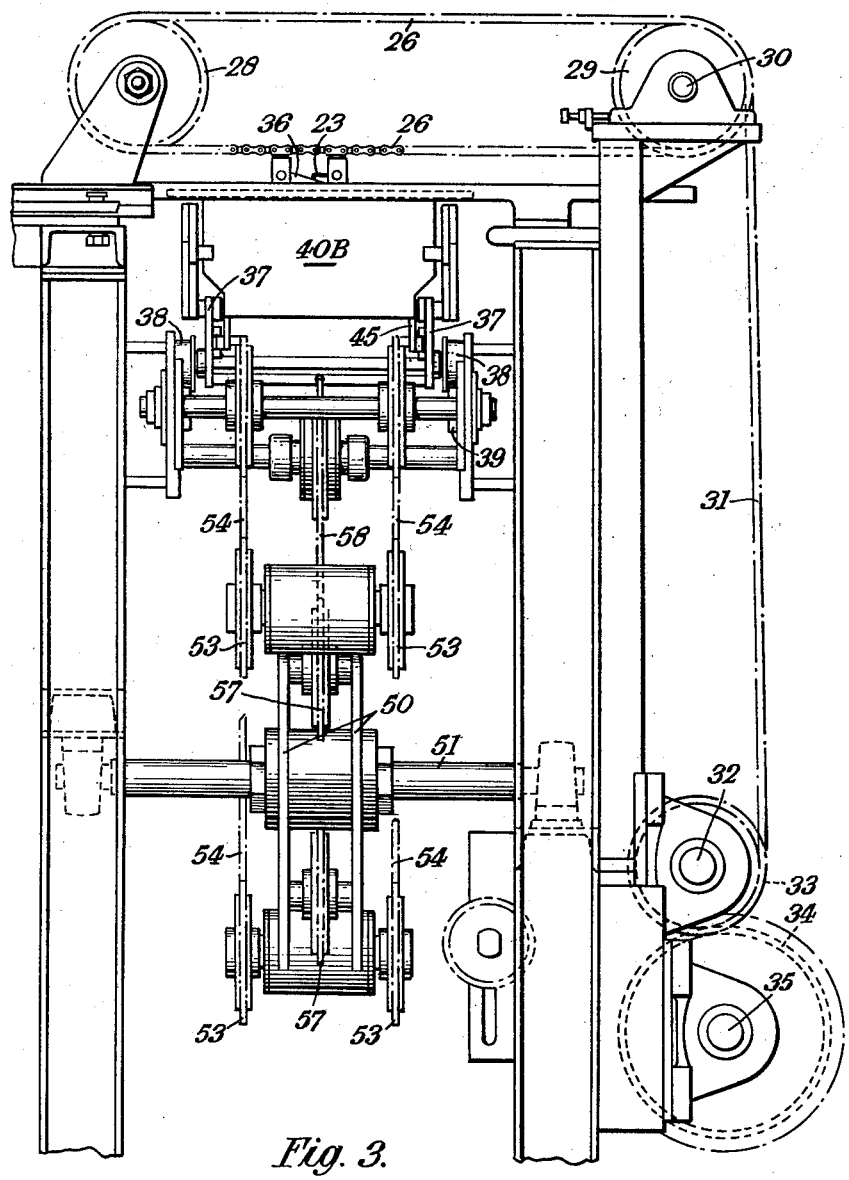
Figure 4:
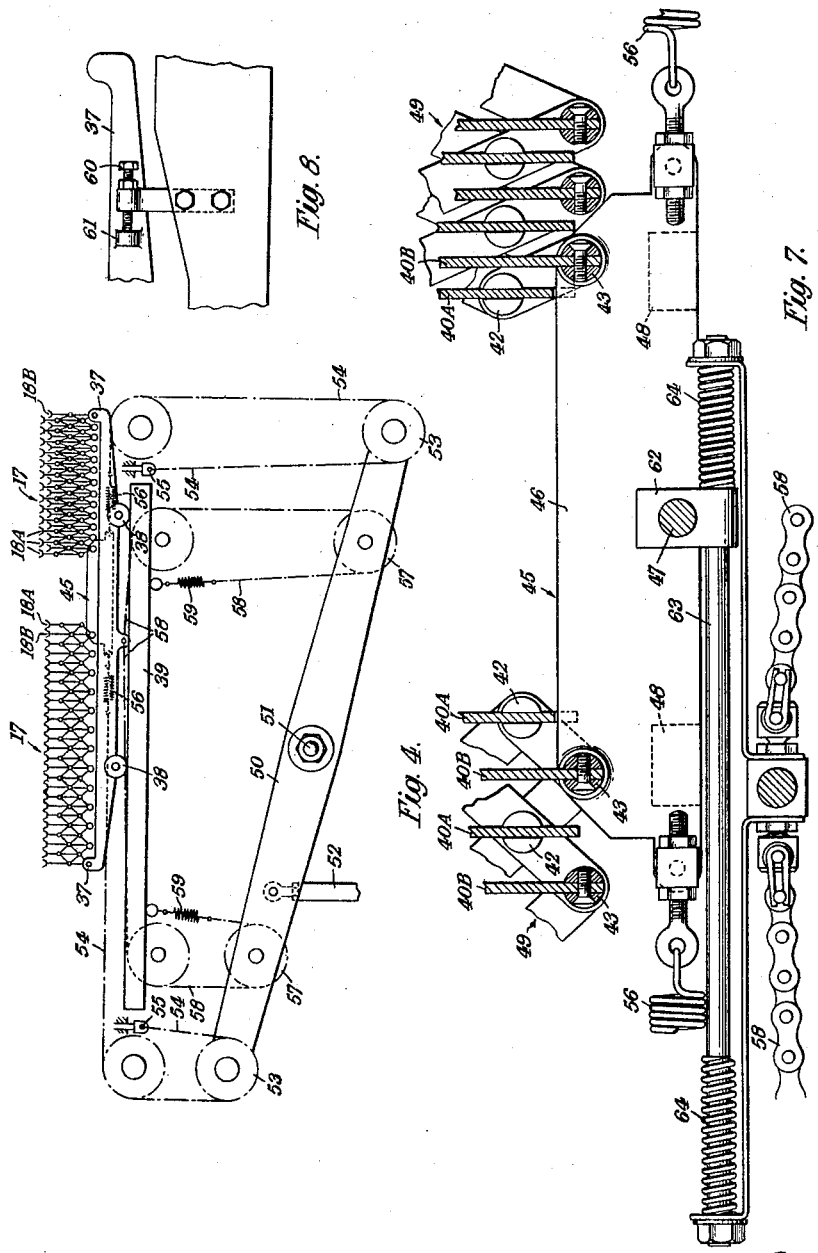
Figure 5:
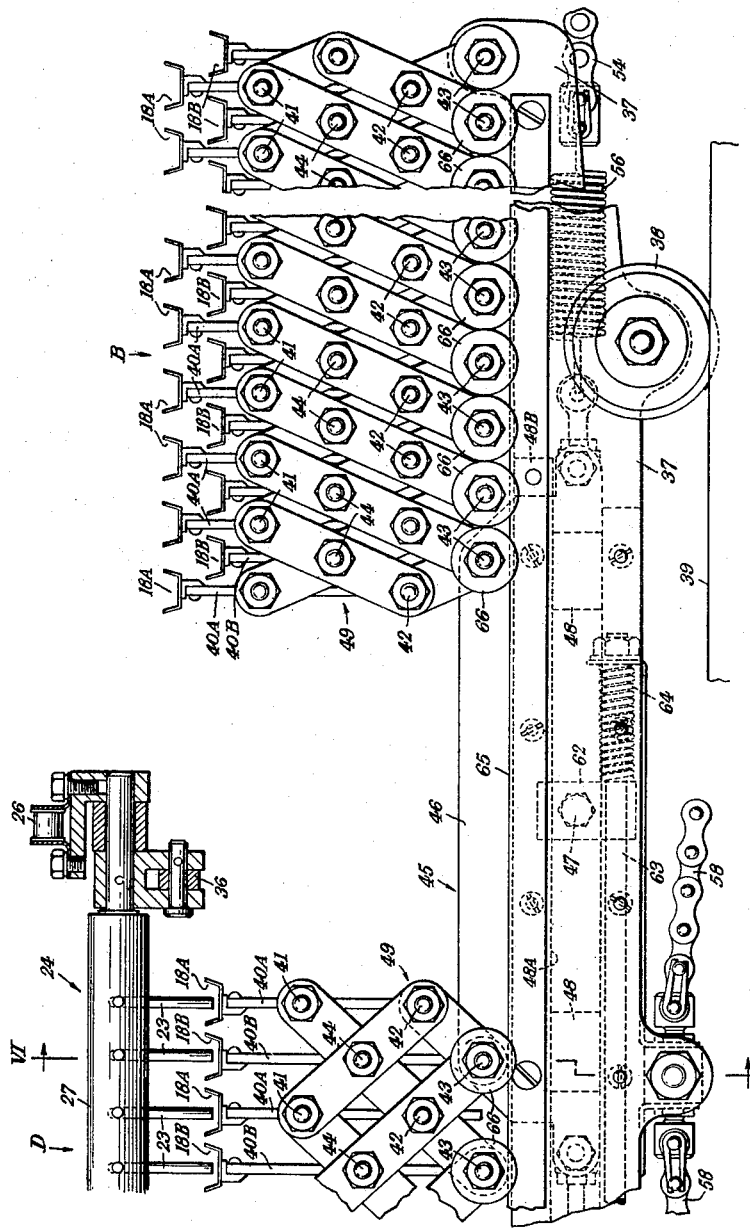
Figure 6:
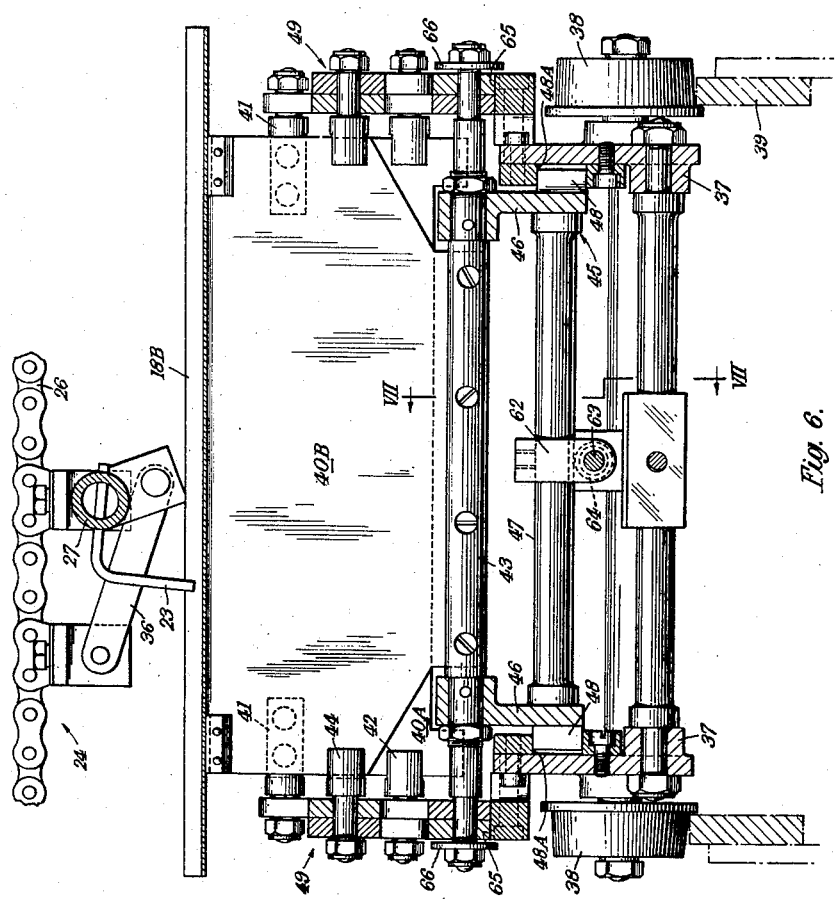

One embodiment of the invention will now be described in detail, by way of example, with reference to the accompanying drawings in which:

FIG. 1 is a diagrammatic plan view of a wafer sandwich cutting unit and associated wafer separators, FIG. 2 is an end elevation of the wafer separators, FIG. 3 is a corresponding side elevation, FIG. 4 is a diagram showing the mechanism for imparting movement to the wafer separators, FIG. 5 is a part elevation of the wafer separators on a larger scale, FIG. 6 is a section on the line VI—VI in FIG. 5, FIG. 7 is a section on the line VII—VII in FIG. 6, FIG. 8 is an enlarged view of a detail, FIG. 9 is an enlarged sectional view showing the ramps for loading the separators, and FIG. 10 is a corresponding plan view.

Like reference numerals indicate like parts throughout the figures.

Referring first to FIG. 1, and as more fully described in British specification No. 785,436, wafer sandwich blocks 10 are fed in succession onto a stationary platform 11, constituting the base plate of a cutting unit, by a conveyor 12. When the blocks reach the position A they are moved alternately to right and left by a pusher 13, actuated by a cam operated lever 13A, through cutters 14 which cut the blocks transversely. The blocks are then fed in two parallel columns by alternately operating pushers 15, actuated by a cam operated lever 15A, through cutters 16 which cut the blocks longitudinally. After passage through the cutters 16, the cut blocks in the two columns are pushed alternately on to wafer separators 17 (FIG. 2) which respectively occupy the positions B and C when they receive cut blocks. As is clear from FIG. 2, each separating table consists of a number of trays, one for each file of sandwiches in a cut block. In the receiving position (B or C) of the separator the trays are disposed alternately at a higher and a lower level, the trays at the higher level being indicated by the reference character 18A and those at the lower level being indicated by the reference character 18B. It will be noted, however, that the trays 18A, 18B are close together in the receiving position, despite their difference in level, so that they may receive adjacent files of sandwiches in the cut block.

Each cut block is pushed on to its separator by the immediately succeeding cut block which has just left the cutter. Thus the cut block 10A which, in FIG. 1, is shown at position B has been moved there by the succeeding block 10B. The cut block 10C will be pushed by the partially cut block 10D behind it on to the separator at position C on the next stroke of the cam lever 15A.

After each separator has been loaded with sandwiches at position B or C as the case may be, it is moved laterally as later described to a discharge position D, the trays 18A and 18B separating and the trays 18A descending to the level of the trays 18B. Here the files of sandwiches are raked from the trays 18A, 18B by fingers 23 (FIG. 2) of a flight conveyor 24 and delivered to a belt conveyor 25 (FIG. 1).

As shown in FIGS. 9 and 10, alternate files of sandwiches are fed to the higher level trays 18A along ascending ramps 19 situated beneath guide fingers 20. The remaining files of sandwiches are fed to the lower level trays 18B along a dead plate 21, hold down tongues 22 preventing these sandwiches from rising with those which travel up the ramps 19 as the result of any adhesion between adjacent sandwiches due to the filling, which may, for example, be caramel. The guide system just described has a shearing effect on any filling which tends to cause adjacent files of sandwiches to stick together and ensures that the files of sandwiches are effectively separated and prevented from fouling the sides of the trays as they are fed on to the trays. Longitudinal separation of the sandwiches is effected by curved extensions 19A, 19B at the end of the dead plate as the trays move from the receiving position to the discharge position D.

The flight conveyor 24, by which the sandwiches are raked from the separated trays at position D, includes a pair of chains 26 (FIGS. 2 and 3) to which are attached bars 27 carrying the fingers 23. The chains 26 run at one end on idler sprockets 28 mounted on a common shaft and at the other end on driving sprockets 29 mounted on a shaft 30 driven by a chain drive 31 from a shaft 32 which, in turn, is driven by gears 33, 34 from a drive shaft 35. The fingers 23 are controlled in position by a supporting link 36 (FIG. 6).

Since the separators 17 are identical, a description in detail of one of them will be sufficient. The two separators are mounted on a carriage constituted by a wheeled trolley 37 having wheels 38 which run on fixed rails 39 to permit of movement of the trolley transversely to the direction of feed of the sandwiches. The trays 18A, 18B are mounted on supporting plates 40A, 40B respectively. The plates 40A of the high level trays 18A are riveted near their upper ends to forked studs 41 (FIG. 6) and are guided near their lower ends for vertical movement by forked studs 42. The plates 40B of the low level trays 18B are fixed at their lower ends to rods 43 and are embraced by forked studs 44. The outermost rod 43 of each separator is fixed to the trolley 37 while the innermost rod 43 of each separator is fixed to a slide 45, consisting of side members 46 joined by bars 47 and carrying slide blocks 48 which can slide in guideways 48A in the trolley. The plates 40A, 40B of each separator are connected by a lazytongs linkage 49, most clearly shown in FIG. 5 and consisting of links joining the studs 41, 44, 42 and the rods 43. When the separator is in its receiving position, as indicated at B in FIG. 5, the lazytongs linkage is collapsed and the trays 18A, 18B are at different levels. The lazytongs linkage of the other separator at the discharge position D is, however, extended and its trays 18A, 18B are at the same level. When the trolley 37 is traversed to the left as seen in FIG. 5, to bring the separator at position B to position D and the separator at position D to position C, the slide 45 moves relatively to the trolley 37, as will now be described, to expand the lazytongs linkage of the separator approaching position D and to contract the lazytongs linkage of the separator leaving position D. A bearing surface 65 (FIG. 5) is provided for supporting the lower pivots of the lazytongs linkages 49 and washers 66 are fitted to these lower pivots at both sides of each linkage. No such bearing surface is, however, required in the case of wider wafer sandwiches.

The mechanism whereby the trolley 37 and the slide 45 is moved in relation to it is shown in FIGS. 2 and 3 and most clearly in FIG. 4. The motion is derived from a beam 50, mounted on a shaft 51, about which it is rocked in timed relationship with the operation of the cutter unit by a cam-operated link 52. The beam 50 carries at its ends sprockets 53 around which run chains 54 fixed at their outer ends 55 and attached at their inner ends by springs 56 to the slide 45. The beam 50 carries further sprockets 57, situated respectively between its pivot 51 and the outer sprockets 52 and around which run chains 58 attached at their outer ends to fixed anchorages 59 and attached at their inner ends to the trolley 37. As the beam 50 is rocked therefore the trolley 37 will receive a lateral movement and the slide 45 will receive a greater lateral movement and so travel on the trolley in the direction of movement of the trolley. Adjustable stops, constituted by screws 60 (FIG. 8), coact with abutments 61 at the ends of the trolley to limit its movement in both directions. The slide 45 carries a depending bracket 62 (FIG. 7) embracing a rod 63 on the trolley and the travel of the slide in relation to the trolley is limited by stops 48B (FIG. 5) which coact with the slide. Helical springs 64 surrounding the ends of the rod 63 act as shock absorbers. The beam 50 is given a stroke in excess of that required to move the trolley and slide to the limit of their travel, the excess stroke of the beam being taken up by the springs 56 and 59.

The apparatus just described is not only able to handle very narrow wafer sandwiches but ensures easy discharge of the sandwiches from the trays, since they are at a common level in the discharge position. It is also easily adjustable to suit wafer sandwiches of different size, since it is only necessary to substitute a fresh trolley carrying an appropriate different tray assemblage and to make such adjustment as may be necessary of the stops which define the limits of travel of the trolley and of the slide.

What I claim as my invention and desire to secure by Letters Patent is:

1. Apparatus for use in the separation of wafer sandwiches from a cut sandwich block which includes a series of parallel trays movable from a receiving position, in which they are situated close together with alternate trays situated at upper and lower levels, to a spaced position in which the trays are spaced apart and are all at the same level, ascending ramps at the receiving position for conducting wafer sandwiches to the high level trays, mechanism for moving the trays from the receiving position to the spaced position after the files of sandwiches in a cut sandwich block have been pushed on to the trays and thereafter returning the trays to their receiving position and an overhead flight conveyor for removing the sandwiches endwise from the trays while they are in their spaced position.

2. Apparatus for use in the manufacture of wafer sandwiches, comprising mechanism for feeding cut sandwich blocks alternately in two parallel columns, a pair of wafer separators, each including a series of parallel sandwich receiving trays, which are movable in a direction transverse to the direction of travel of the columns, means for moving the separators, intermittently and simultaneously in timed relationship with the feeding mechanism, from a position in which one separator is in a position to receive cut sandwich blocks from one column and the other separator is at a discharge position situated between the columns, to an alternative position in which the first separator is at the discharge position and the other separator is in position to receive cut sandwich blocks from the other column, mechanism controlling the trays of each separator so that they are situated close together with alternate trays at upper and lower levels when the separator is in its receiving position and are spaced apart and at the same level when the separator is in the discharge position, ascending ramps at each receiving position for conducting wafer sandwiches to the high level trays, and an overhead flight conveyor for removing the sandwiches endwise from the trays of the separator which is in the discharge position.

3. Apparatus as claimed in claim 2, in which the two separators are supported by lazytongs linkages on a common carriage which is movable transversely to the columns, the linkages being connected to a slide which is constrained to move lengthwise of the carriage, as the latter makes its transverse movement, to expand one lazytongs linkage and contract the other.

4. Apparatus as claimed in claim 3, which includes a rocking beam for imparting transverse movement to the carriage and also connected to the slide to impart thereto a transverse movement in the same direction as but greater than the movement of the carriage.

5. Apparatus as claimed in claim 4, which includes end stops for limiting the movements of the carriage and the slide and wherein the beam receives an excess stroke and is connected by springs to the carriage and slide.

References Cited in the file of this patent
UNITED STATES PATENTS
2,956,524    Dewhurst _____ Oct. 18, 1960